UNITED STATES PATENT OFFICE.

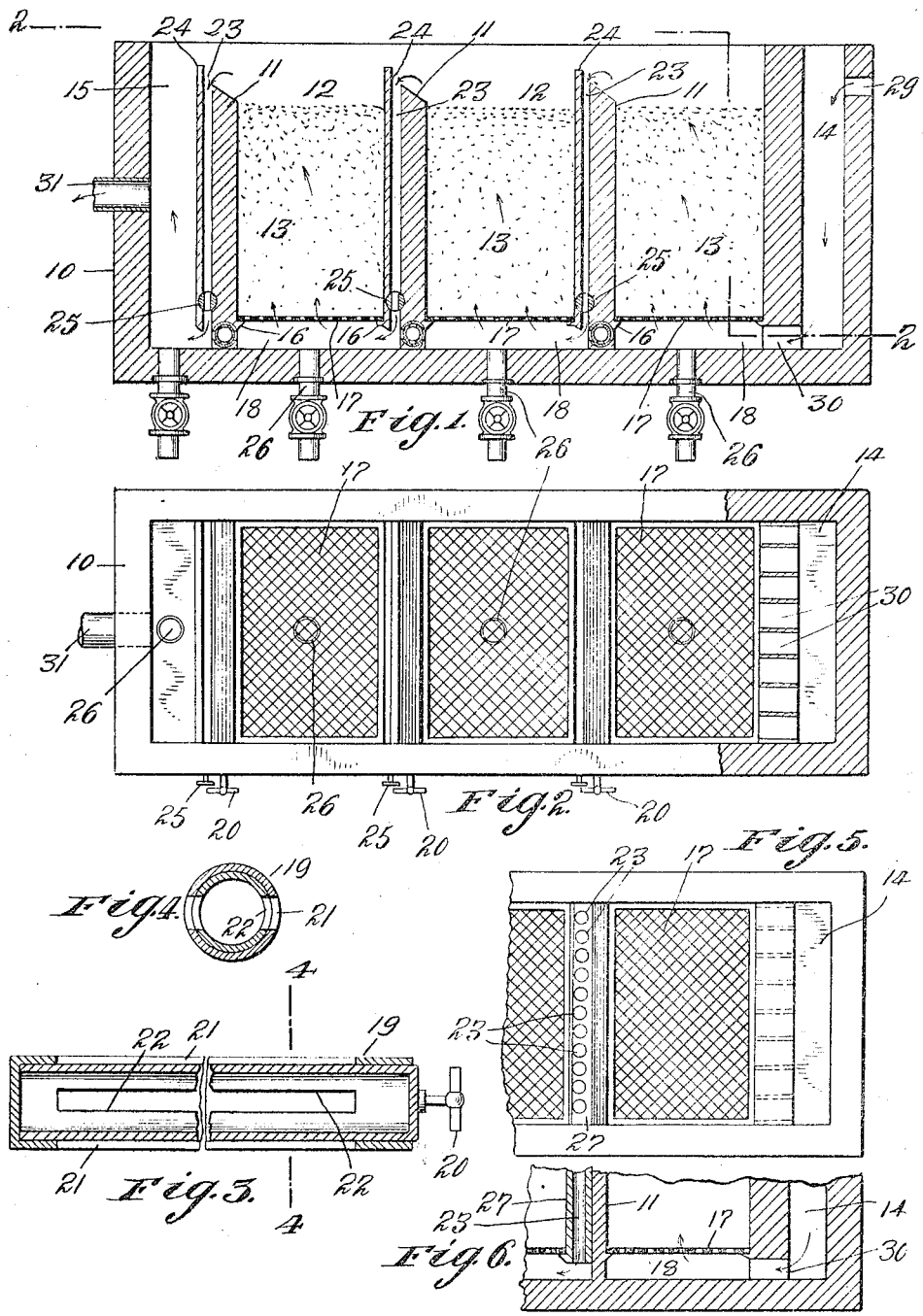

PETER SUYKERBUYK, OF NEW YORK, N. Y.

FILTER.

1,031,886.　　　　Specification of Letters Patent.　　Patented July 9, 1912.

Application filed September 30, 1911. Serial No. 652,121.

*To all whom it may concern:*

Be it known that I, PETER SUYKERBUYK, a citizen of the United States, and a resident of New York city, in the county of New York and State of New York, have invented certain new and useful Improvements in Filters, of which the following is a specification.

My invention relates to filters and the object of my invention is to provide a filter for filtering water in which the water flows upward through the filter bed.

A further object is to provide a plurality of filter beds located side by side and so arranged that the under surface of the filter beds may be easily cleaned by directing a stream of water across their surfaces.

A further object is to provide means whereby water may be drawn from the filter after passing through any one of the filter beds.

A further object is to provide a filter in which the water may be caused to flow upward through all of the filter beds at the same time, or upward through some of the filter beds and downward through the other filter beds, depending on the condition of the water to be filtered and the quantity of water required to be filtered per hour and the use for which the water is required.

Referring to the drawings which form a part of this specification Figure 1 is a longitudinal sectional view through a filter embodying my invention. Fig. 2 is a plan view of the construction shown in Fig. 1, on lines 2—2 thereof. Fig. 3 is a longitudinal sectional view through one of the valves used in the construction of the filter when more than one filter bed is used. Fig. 4 is a cross sectional view of the valve on line 4—4 of Fig. 3. Fig. 5 is a plan view of a portion of a modified construction of filter embodying my invention. Fig. 6 is a longitudinal sectional view of the construction disclosed in Fig. 5.

10, indicates the outer walls of the filter which I prefer to make of concrete or other suitable material, and formed integral therewith are cross walls 11—11 forming chambers 12—12 in which filtering material 13—13 is placed, and at each end of the filter a chamber 14 and 15 respectively is formed, the chamber 14 serving as the inlet chamber for the water prior to filtering, and the chamber 15 serving as the outlet chamber for the filtered water.

Near the bottom of each of the chambers 12, brackets 16—16 are formed which extend across the chambers from one side to the other and a grid 17 is supported on each pair of said brackets which in turn holds the filtering material 13. Between the grids and the bottom of the filter is formed compartments 18—18. Located in the bottom of each cross wall is a valve 19 provided with a handle 20 which projects through one of the side walls as illustrated. This valve may be made by taking two tubes, the outer surface of the smaller of which fits the inner surface of the larger tube, and after capping one end of each of said tubes, cutting the slots 21 and 22 in the tubes respectively, so that when the inner tube is rotated the slots may be made to register to form ports through which the water may pass from one chamber 18 to the next, after the valves 19 are set in the walls 11, as will be readily understood.

The outer wall 10 is carried to a little greater height than the cross walls 11, to permit the filter to be operated in a manner more fully explained hereinafter. In each of the cross walls 11 is formed a passage 23 which extends from the top of one chamber 12 to the compartment 18 below the adjacent chamber 12 and one side of the wall 12 is built higher adjacent the passage 23 as illustrated at 24, to prevent the water from flowing directly over the cross wall from one chamber 12 to the next chamber when the valves 25 are open. The valves 25 control the passages 23 and are preferably of the same construction as those indicated by 19.

Valve controlled pipes 26 are located in the bottom of the filter and communicate with the chambers 18.

Referring to Figs. 5 and 6, I show a modification which consists in making the passages 23 by molding a portion 27 separate from the cross wall 11 and forming the passages 23 therein and then setting this wall against the side of the wall 11. It will be noted that a plurality of passages 23 are thus formed in each wall and serve to distribute the water evenly for the adjoining chamber.

The filter may be operated as follows: Assuming the valves 19 to be closed and valves 25 open, the water will flow into chamber 14 through pipe 29 and then through passages 30—30 into chamber 18 and up through the first grid 17 and filter bed 13 over the wall 11 and down through passage 23 beneath the second filter bed and then upward through said bed and down through the next passage 23, and so on to the outlet chamber 15 and from said chamber through pipe 31. This arrangement carries all the water through each filter bed. Now by opening the valve 19 nearest to the compartment 14, the water will flow partly through valve 19 and upward through the two adjacent filter beds at the same time, and down through a passage 23 and up through the third filter bed and then to the last passage 23 to chamber 15. This might be advisable where the water is very dirty to cause the dirt to be deposited on the two lower surfaces of the first two grids instead of collecting most all of it on the surface of the first grid only and therefore the filter will not need to be cleaned so often. By opening all of the valves 19 except the last one adjacent to the chamber 15, and closing all of the valves 25, the water would flow upward through all of the beds at the same time, thus increasing the capacity of the filter. It will be understood that I may have any number of filter beds required for the amount of water to be filtered per minute, and that by this system of construction and operation I can change the rate of flow through the filter. By collecting the dirt on the bottoms of the grids, I can more easily clean the filter which I prefer to do by first letting the water flow directly from the chamber 14 through the valve 19 across the faces of the grids, while the valve controlling the pipes 26 are open, thus washing the dirt directly out of the filter. I may also permit the water to flow up through the first filter bed and down through the other beds and out through the pipes 26 below the filter beds, to clean them if necessary. I may also use the top surfaces of the filter beds with the exception of the first one as the first filtering surface if desired, by closing the valves 25 and thus causing the water to flow up through the first bed and over the cross walls and down through the other beds.

Having thus described my invention, I claim as new:

1. A filter comprising an outer wall or casing, a plurality of cross walls extending from one side of said casing to the opposite side thereof and forming a plurality of separate chambers, a grid located near the bottom of said chambers, filtering material supported by said grids, a valve located in the bottom of each of said cross walls, and means for directing water beneath said grids and upward through said filter beds to an outlet chamber.

2. A filter comprising an outer casing, a plurality of cross walls extending from one side to the other of said casing and of less height and forming a plurality of separate chambers, a grid located near the bottom of each of said chambers, a passageway leading from the top of one of said filter beds to a point beneath the adjacent filter bed, a valve controlling said passage, and means for leading water beneath one of said grids and upward through the filter bed supported thereby and thence over the intermediate filter beds to the outlet.

3. A filter comprising an outer casing, a plurality of cross walls extending from one side to the other of said casing and of less height and forming a plurality of separate chambers, an inlet chamber at one side of said casing and an outlet chamber at the other side thereof, a grid located near the bottom of each of said filtering chambers, a passageway leading from the top of one of said filter beds to a point beneath the adjacent filter bed, a valve controlling said passage, and means for leading water beneath one of said grids and upward through the filter bed supported thereby and downward through said passage to a point beneath the adjacent filter bed, or upward through said filter bed and over an intermediate filter bed to the outlet chamber.

4. A filter comprising a casing, a plurality of cross walls extending from one side of said casing to the opposite side and forming a plurality of filtering chambers, a valve located in each of said cross walls and adapted to establish a passage for the flow of water from beneath one filter bed to beneath the adjacent filter bed, a grid located near the bottom of each of said filtering chambers, a passageway formed in each of said cross walls leading from near the top of said chambers to a point below said grids, and means for directing the water upward through one of said filter beds and downward through one of said passages and upward through the next filter bed to successively filter the water.

5. A filter comprising a casing having a plurality of chambers formed therein, filtering material located in each of said chambers and walls separating said chambers, means for conducting the liquid from the bottom of one chamber and upward through the filtering material, then downward to the bottom of the next chamber, and then upward again through the filtering material, said means comprising a plurality of passages formed in the walls of said chambers and distributed uniformly across said walls to secure a uniform distribution of water for the succeeding chamber.

Signed at New York city in the county of New York and State of New York this 27th day of September A. D. 1911.

PETER SUYKERBUYK.

Witnesses:
FRANK M. ASHLEY,
MINNIE S. MILLER.